(12) United States Patent
Mauri

(10) Patent No.: US 10,756,632 B2
(45) Date of Patent: Aug. 25, 2020

(54) POWER SUPPLY WITH AUXILIARY CONVERTER FOR EXTENDED INPUT VOLTAGE RANGE

(71) Applicant: Bel Fuse (MACAO COMMERCIAL OFFSHORE) Limited

(72) Inventor: Giorgio Augusto Mauri, Milan (IT)

(73) Assignee: Bel Fuse (Macao Commerical Offshore) Limited, Macao (MO)

( * ) Notice: Subject to any disclaimer, the term of this patent is extended or adjusted under 35 U.S.C. 154(b) by 0 days.

(21) Appl. No.: 16/010,649

(22) Filed: Jun. 18, 2018

(65) Prior Publication Data

US 2018/0375421 A1 Dec. 27, 2018

Related U.S. Application Data

(60) Provisional application No. 62/524,703, filed on Jun. 26, 2017.

(51) Int. Cl.
*H02M 3/335* (2006.01)
*H02M 1/36* (2007.01)
*H02M 1/00* (2006.01)

(52) U.S. Cl.
CPC .............. *H02M 3/335* (2013.01); *H02M 1/36* (2013.01); *H02M 2001/007* (2013.01);
(Continued)

(58) Field of Classification Search
CPC .... H02M 1/088; H02M 1/32; H02M 3/33507; H02M 2001/008; H02M 2001/0074; H02M 2001/007; H02M 2001/4275; H02M 3/1584; H02M 2001/0064; H02M 2001/0067; H02M 2001/0093; H02M 2001/0096; H02M 2001/0077; H02J 2001/008
See application file for complete search history.

(56) References Cited

U.S. PATENT DOCUMENTS 5,073,848 A 12/1991 Steigerwald et al.
5,377,090 A 12/1994 Steigerwald
(Continued)

OTHER PUBLICATIONS

Morrison, "Distributed Power Moves to Intermediate Voltage Bus", Electronic Design, Sep. 16, 2002.
(Continued)

*Primary Examiner* — Gustavo A Rosario-Benitez
(74) *Attorney, Agent, or Firm* — BainwoodHuang

(57) ABSTRACT

A DC power supply includes a point-of-load (PoL) regulator providing power to a load with a desired efficiency only when a PoL input voltage is in a first sub-range of a specified larger system input voltage range. The supply has an auxiliary circuit with an output in series with the supply input, generating an auxiliary voltage and adding it to the DC supply voltage to form a boosted supply voltage. Switching circuitry connects the supply input to the PoL input to apply a DC supply voltage as the PoL input voltage when the supply voltage is in the first sub-range, and connects the output of the auxiliary circuit to the PoL input to apply the boosted supply voltage as the PoL input voltage when the supply voltage is outside the first sub-range, maintaining the PoL input voltage within the first sub-range.

7 Claims, 12 Drawing Sheets

(52) U.S. Cl.
CPC ................ *H02M 2001/008* (2013.01); *H02M 2001/0048* (2013.01); *H02M 2001/0093* (2013.01)

(56) References Cited

U.S. PATENT DOCUMENTS

| | | | |
|---|---|---|---|
| 6,326,773 B1* | 12/2001 | Okuma | H02J 3/1807 323/209 |
| 6,788,033 B2 | 9/2004 | Vinciarelli | |
| 6,930,893 B2 | 8/2005 | Vinciarelli | |
| 7,145,786 B2 | 12/2006 | Vinciarelli | |
| 8,023,290 B2 | 9/2011 | Schlecht | |
| 2004/0184294 A1* | 9/2004 | Stojcic | H02J 1/08 363/144 |
| 2006/0268483 A1* | 11/2006 | Byers | H02J 9/061 361/92 |
| 2007/0019442 A1* | 1/2007 | Li | H02J 1/08 363/15 |
| 2009/0206804 A1* | 8/2009 | Xu | H02M 3/1584 323/234 |
| 2011/0254512 A1* | 10/2011 | Nergaard | H02M 1/42 320/162 |
| 2011/0298439 A1* | 12/2011 | Ng | H02M 3/1584 323/283 |
| 2012/0297104 A1* | 11/2012 | Thottuvelil | G06F 13/4004 710/305 |
| 2015/0222193 A1 | 8/2015 | Zambetti et al. | |
| 2016/0226385 A1* | 8/2016 | Phadke | H02M 3/335 |
| 2017/0126146 A1* | 5/2017 | Petersen | H02M 3/158 |
| 2017/0207723 A1* | 7/2017 | Zhang | H02M 7/537 |

OTHER PUBLICATIONS

Strassberg, "Distributed Power: taming the DRAGONS", EDN, Jul. 2003.
Bell, "Cascaded power converters find acceptance as performance demands increase", EDN, Aug. 21, 2003.
Smith, "Benefits of the DC Bus Converter in Distributed Power Architectures for Networking & Communications Systems", Presented at Electronica USA, Apr. 2004.
Miftakhutdinov, "Improving System Efficiency with a New Intermediate-Bus Architecture", Texas Instruments SEM1800 Power Supply Seminar, 2008-2009.
"Designing a Power Supply with Multiple Input Options", Vicor Application Note, Dec. 1996.

* cited by examiner

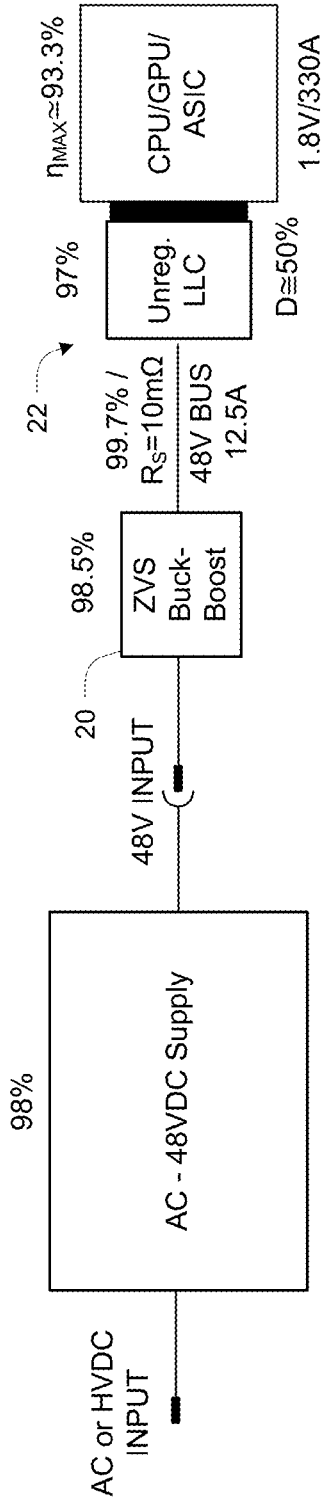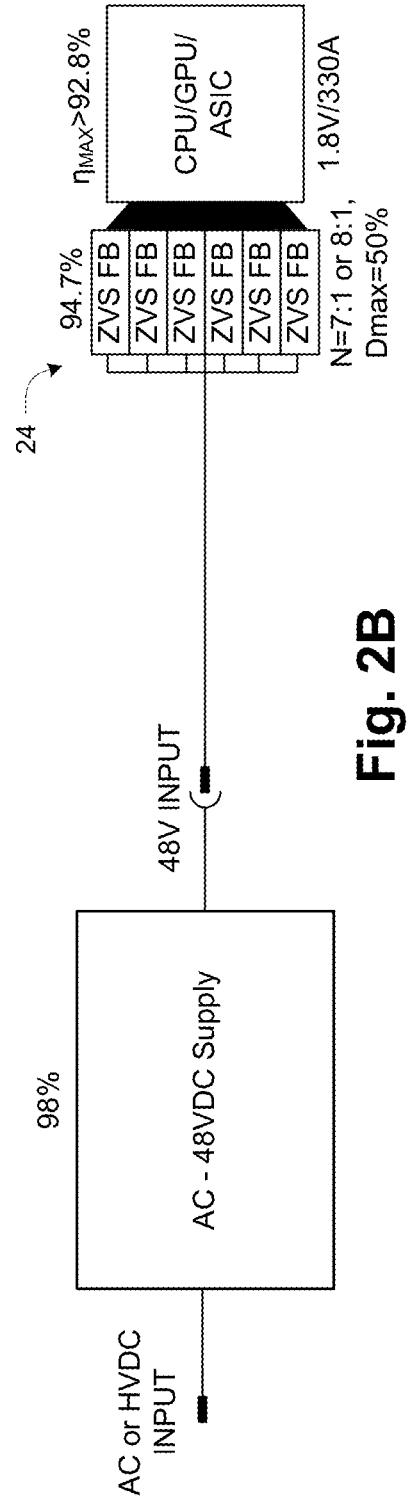
Fig. 2A (prior art)
Fig. 2B (prior art)

POWER SUPPLY WITH AUXILIARY CONVERTER FOR EXTENDED INPUT VOLTAGE RANGE

BACKGROUND

The invention relates to the field of power supplies, and in particular to power supplies employing point-of-load (PoL) DC regulators receiving a DC PoL input voltage.

To maximize power conversion efficiency and availability, equipment such as telecommunication, data processing and networking equipment traditionally use an on-board 12V-bus power distribution architecture. Depending on system configuration, either a direct AC-to-12 VDC conversion or an AC-to-48 VDC power distribution followed by local, on-board, 48V-to-12V bus conversion may be used. Voltage regulation at the Point of Load (PoL), i.e. CPU, GPU, ASICs, memory and other system rails, is then realized with 12Vin non-isolated buck regulators configured for single-phase or multi-phase, interleaved, operation.

A recent trend in high performance computing and server boards is replacing the traditional 12V-bus with a 48V power distribution. Then, either a 2-stage conversion or a direct conversion from 48V to the Point-of-Load can be conveniently used to eliminate the intermediate 48V-to-12V bus conversion and power distribution losses typically associated with high current busses. Resulting efficiency gains in the range of 4%-5%, at the system level, from the AC source to the Point-of-Load, can be realized, and these can translate into lower operating costs for large installations like data centers or telecommunications central offices where a large number of voltage regulators are used.

48V-to-PoL regulators are nevertheless more expensive than legacy buck regulators, so it is important to maximize their efficiency to fully take advantage of this power distribution architecture. The high power rails, CPU, GPU, ASICs and memory, of a typical server motherboard are areas where increased conversion efficiency becomes more profitable. Industry organizations like the Open Compute Project (OCP) are setting standards intended to achieve a favorable balance between increased material costs and lower operating costs to minimize the total cost of ownership of the equipment. To that extent, certain minimum efficiency requirements are specified.

In many cases, applications with highly variable computing workloads may require high efficiency not only at the Thermal Design Power (TDP) point but also over a widely variable range of output currents, representative of the instantaneous CPU usage. It is common industry practice, in 12V-bus systems, to implement scalable output power by means of multiple, paralleled and interleaved non-isolated buck converters. This is a valuable feature that becomes more difficult to design in 48V-to-PoL systems, given the higher voltage conversion ratio and, consequently, the lower duty cycle that would be necessary for the standard buck topology. PoL regulators with isolated topology may be used, with benefits relating to input voltage polarity, duty cycle and load protection in case of hard failures, but they are subject to more stringent size constraints because they use more magnetic components as compared to 12Vin buck regulators and their corresponding 48Vin versions.

Another typical requirement for voltage regulators is to operate over a wide input voltage range. A nominal input voltage of +54.5 VDC can actually range from +40V to +59.5 VDC, and the extended minimum bus voltage may drop down to +38 VDC when the system is running off local battery backup voltage. Operation at low line is necessarily limited to short periods of time, with marginal impact on global operating costs, but the associated wide input voltage range imposed on voltage regulators may detract from the highest efficiency or maximum output power achievable from a given topology.

In summary, voltage regulator efficiency is affected by a number of design trade-offs and is therefore very difficult to maximize over a large set of operating conditions. While the multi-phase, interleaved buck converter is the industry workhorse for scalable output power, there is no similar, commonly accepted solution addressing scalability with respect to input voltage range currently available.

SUMMARY

Methods and apparatus are disclosed that can significantly reduce the set of operating conditions of voltage regulators while maintaining scalability with respect to both output power and input voltage, at minimum additional cost and high power density, applicable to both isolated and non-isolated configurations.

In the disclosed methods and apparatus, PoL voltage regulators may be designed with a narrow input voltage range for maximum efficiency under nominal and high line operating conditions. An auxiliary converter is used to extend the low line voltage of the system down below the input voltage range of the voltage regulators without sacrificing efficiency. The auxiliary converter is active only when the input voltage is less than the minimum input voltage of the voltage regulators. The input voltage range of the auxiliary converter can be limited with a comparator based under- and over-voltage lock-out circuit. A soft start circuit can thus provide controlled turn-on of the auxiliary converter when the input voltage falls below the minimum input voltage of the voltage regulators. Alternatively, a host processor with input voltage telemetry or an on-board power management IC can be used to enable and disable the auxiliary converter. The auxiliary converter may be isolated and have its output connected in series with the input bus voltage. The voltage fed to the regulators is thus the sum of the input bus voltage plus the output voltage of the auxiliary converter. The output voltage of the auxiliary converter is a fraction of the voltage supplied from the input bus voltage at low line. Hence, the auxiliary converter is processing only a fraction of the total output power of the voltage regulators. Also, it operates only for a fraction of the total operating time, when the input bus voltage is low. Power management functions, like telemetry of input voltage, current and power and output voltage trimming for the auxiliary converter as a function of input voltage are optionally available. A digital interface (e.g., I2C with PMBus, SMBus, etc.) for communication with a host processor is preferably used to coordinate the operations of the power conversion sub-systems. The proposed method enables extended low line operation of voltage regulation sub-systems with minimal impact on efficiency, size and cost.

More particularly, a DC power supply is disclosed for providing DC power to a load at a DC load voltage substantially lower than a nominal DC supply voltage at a supply input. The supply includes a point-of-load (PoL) regulator having a PoL output coupled to the load, with the PoL regulator being configured and operative to provide DC power to the load (1) at a first efficiency when a PoL input voltage applied to a PoL input of the PoL regulator is in a first sub-range of a specified input voltage range for the DC supply voltage, and (2) at a second efficiency lower than the first efficiency when the PoL input voltage is in a second sub-range distinct from the first sub-range in the specified input voltage range.

The supply further includes an auxiliary circuit having an output connected in series with the supply input, the auxiliary circuit being configured and operative to generate an auxiliary voltage and add it to the DC supply voltage to form a boosted supply voltage. Switching circuitry is configured and operative in response to a level of the DC supply voltage to (1) connect the supply input to the PoL input to apply the DC supply voltage as the PoL input voltage when the DC supply voltage is in the first sub-range, and (2) connect the output of the auxiliary circuit to the PoL input to apply the boosted supply voltage as the PoL input voltage when the DC supply voltage is in the second sub-range.

The supply can achieve improved efficiency over a wide system input voltage range even when using PoL regulators that provide desired efficiency over only a narrower PoL input voltage range (first sub-range), by using the auxiliary circuit to generate the boost voltage when the DC supply voltage falls outside the first sub-range.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 2A and 2B are block diagrams of power supply systems foregoing use of an intermediate supply voltage as known in the art;

DETAILED DESCRIPTION

Figure 1A:
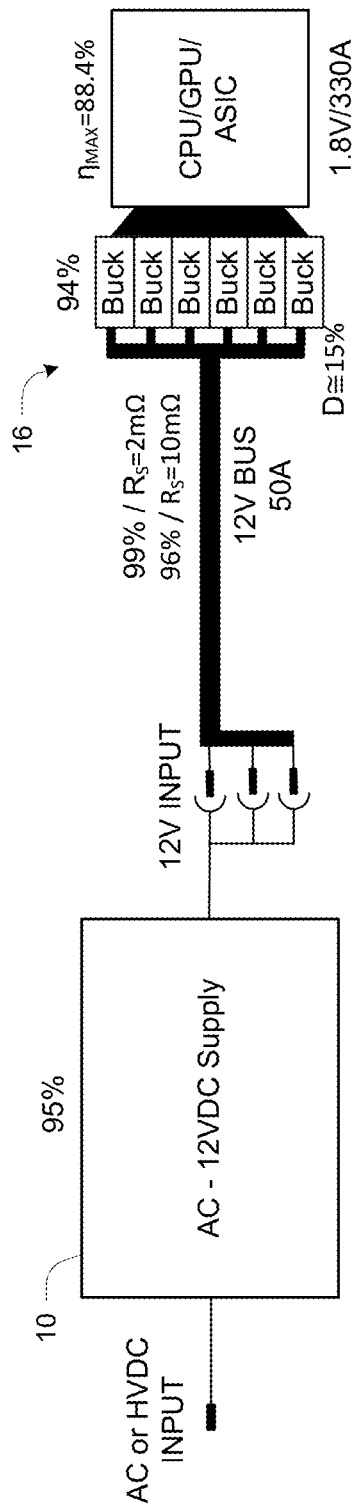
FIGS. 1A and 1B are block diagrams of power supply systems employing an intermediate supply voltage as known in the art.
Figure 1B:
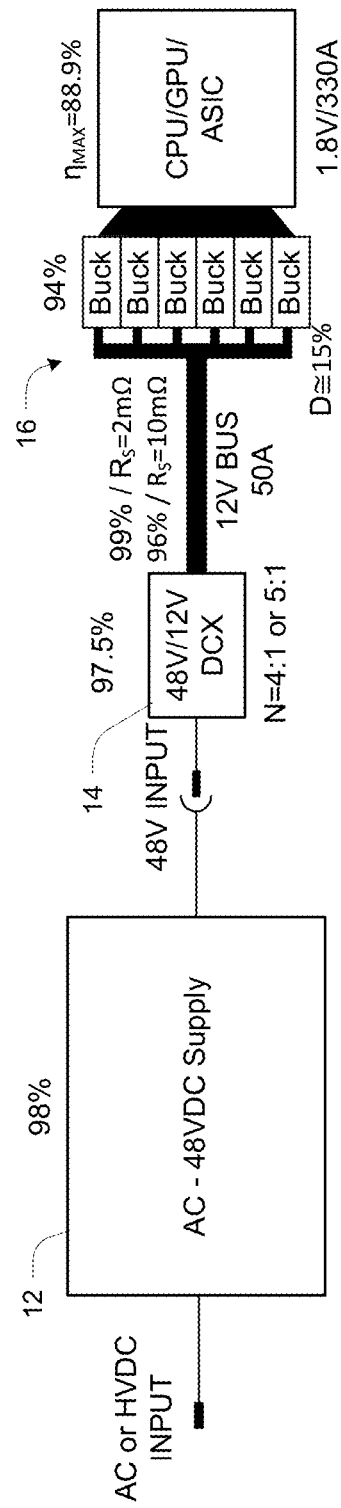

FIGS. 1A and 1B show known on-board 12V-bus power distribution architectures traditionally used in electronic devices such as telecommunication, data processing and networking equipment. Depending on system configuration, either a direct AC-to-12 VDC conversion 10 (FIG. 1A) or an AC-to-48 VDC power distribution 12 followed by local, on-board, 48V-to-12V bus conversion 14 (FIG. 1B) may be used. Voltage regulation at the Point of Load (PoL), i.e. CPU, GPU, ASICs, memory and other system rails, is realized with 12V-input (12Vin) non-isolated buck regulators 16 configured for single-phase or multi-phase, interleaved, operation.

FIGS. 2A and 2B illustrate a more recent trend used for example in high performance computing and server boards, in which the traditional 12V-bus is replaced by on-board 48V power distribution. FIG. 2A shows an arrangement employing two-stage conversion with a zero voltage switching (ZVS) buck-boost converter 20 followed by unregulated LLC converters 22 at the PoL, while FIG. 2B shows a direct-conversion arrangement using ZVS full bridge (FB) converters 24 at the PoL. These approaches can be used to eliminate the intermediate 48V-to-12V bus conversion and power distribution losses typically associated with high current busses. Resulting efficiency gains in the range of 4%-5%, at the system level, from the AC source to the Point-of-Load, may thus translate into lower operating costs for large installations like data centers or telecommunications central offices where a large number of voltage regulators are used. 48V-to-PoL regulators are nevertheless more expensive than legacy buck regulators so it is paramount to maximize their efficiency to fully take advantage of the new power distribution architecture. The high power rails, CPU, GPU, ASICs and memory, of a typical server motherboard are the areas where increased conversion efficiency becomes more profitable.

Industry organizations like the Open Compute Project (OCP) are setting standards intended to achieve a favorable balance between increased material costs and lower operating costs to minimize the Total Cost of Ownership of the equipment. To that extent, minimum efficiency requirements such as the following are specified:

"The efficiency for the CPU shall be higher than 94% at TDP point for VRM output voltage equal to 1.8V [CPU] and 89% at TDP point for VRM output voltage equal or less than IV measured from input at 54.5V to the output"

In many cases, applications with highly variable computing workloads may require high efficiency not only at the Thermal Design Power (TDP) point but also over a widely variable range of output currents, representative of the instantaneous CPU usage. It is common industry practice, in 12V-bus systems, to implement scalable output power by means of multiple, paralleled and interleaved non-isolated buck converters. This is a valuable feature that becomes more difficult to design in 48V-to-PoL systems, given the higher voltage conversion ratio and, consequently, the lower duty cycle that would be necessary for the standard buck topology.

Isolated topologies may be preferable at the PoL for their flexibility with respect to input voltage polarity, duty cycle and for load protection in case of hard failures. However, they may be subject to more stringent size constraints because they use more magnetic components as compared to 12Vin buck regulators and their corresponding 48Vin versions.

Another typical requirement for voltage regulators is to operate over a wide input voltage range. A nominal input voltage of +54.5 VDC can actually range from +40V to +59.5 VDC, and the extended minimum bus voltage may drop down to +38 VDC when the system is running off local battery backup voltage. Operation at low line is necessarily limited to short periods of time, with marginal impact on global operating costs, but the associated wide input voltage range imposed on voltage regulators may detract from the highest efficiency or maximum output power achievable from a given topology.

Thus, voltage regulator efficiency is affected by a number of design trade-offs and is therefore very difficult to maximize over a large set of operating conditions. While the multi-phase, interleaved buck converter is the industry workhorse for scalable output power, no similar, commonly accepted solution addressing scalability with respect to input voltage range is currently available.

Methods and apparatus are disclosed that can significantly reduce the set of operating conditions of voltage regulators while maintaining scalability with respect to both output power and input voltage, at minimum additional cost and high power density, applicable to both isolated and non-isolated configurations.

In the disclosed methods and apparatus, PoL voltage regulators may be designed with a narrow input voltage range for maximum efficiency under nominal and high line operating conditions. An auxiliary converter is used to extend the low line voltage of the system down below the input voltage range of the voltage regulators without sacrificing efficiency. The auxiliary converter is active only when the input voltage is less than the minimum input voltage of the voltage regulators. The auxiliary converter may be isolated and have its output connected in series with the input bus voltage. The voltage fed to the regulators is thus the sum of the input bus voltage plus the output voltage of the auxiliary converter. The output voltage of the auxiliary converter is a fraction of the voltage supplied from the input bus voltage at low line. Hence, the auxiliary converter is processing only a fraction of the total output power of the voltage regulators. Also, it operates only for a fraction of the total operating time, when the input bus voltage is low. Power management functions, like telemetry of input voltage, current and power and output voltage trimming for the auxiliary converter as a function of input voltage are optionally available. A digital interface (e.g., I2C with PMBus, SMBus, etc.) for communication with a host processor is preferably used to coordinate the operations of the power conversion sub-systems. The proposed method enables extended low line operation of voltage regulation sub-systems with minimal impact on efficiency, size and cost.

When PoLs using buck topology are used in applications with large input-to-output voltage difference, the duty cycle becomes very low with consequently short minimum ON time of the main switch. The problem is exacerbated if high switching frequencies are used to achieve high power density. Efficiency suffers. To overcome this issue, isolated topologies are desirable because of the voltage scaling factor provided by a transformer turns ratio. In one example, a single stage, direct conversion, quasi-resonant topology may be used at the PoL. Although this avoids the efficiency issue associated with low duty cycle operation, it presents another efficiency issue associated with input voltage. Such converters typically operate at variable switching frequency and have a quadratic dependency of the switching frequency with input voltage. Switching losses are proportional to switching frequency and thus are highest at minimum input voltage.

Figure 3:
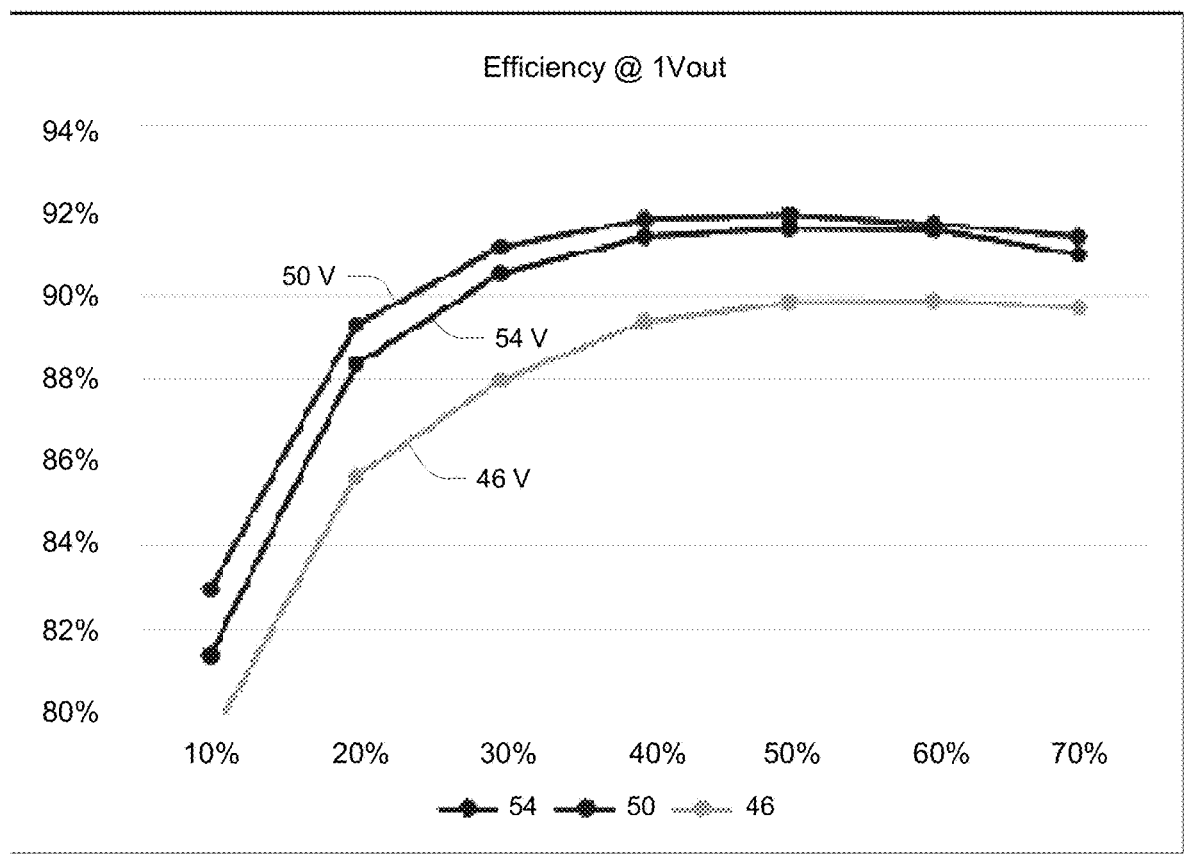
FIG. 3 is a plot of efficiency of a DC power supply for different input voltages as known in the art.

FIG. 3 is representative of the efficiency versus output current and input voltage of a converter having a single stage, direct conversion, quasi-resonant topology. Such a converter has excellent performance at high line voltage or "high line", but fails to meet OCP minimum efficiency requirements at low line voltage or "low line" due to a drop in efficiency. In FIG. 3, high line is shown as 54 V and low line as 46 V. Low line operation has approximately 2% lower efficiency.

More generally, a number of topologies that are suitable for 48V-to-PoL regulators, for different reasons, naturally lend themselves to operation at high input voltage or can be more efficient if their input voltage range is limited. Other power conversion architectures may use fixed voltage transformation ratio converters, either transformer-based or transformer-less. It is typical of these topologies to have no line regulation capability and limited load regulation (e.g., sine amplitude converter), or very limited output voltage trim range because of input voltage range constraints. Using an auxiliary converter with trimmable output voltage can overcome some of those limitations, when used together with control and telemetry functions, by providing partial regulation.

Figure 4:
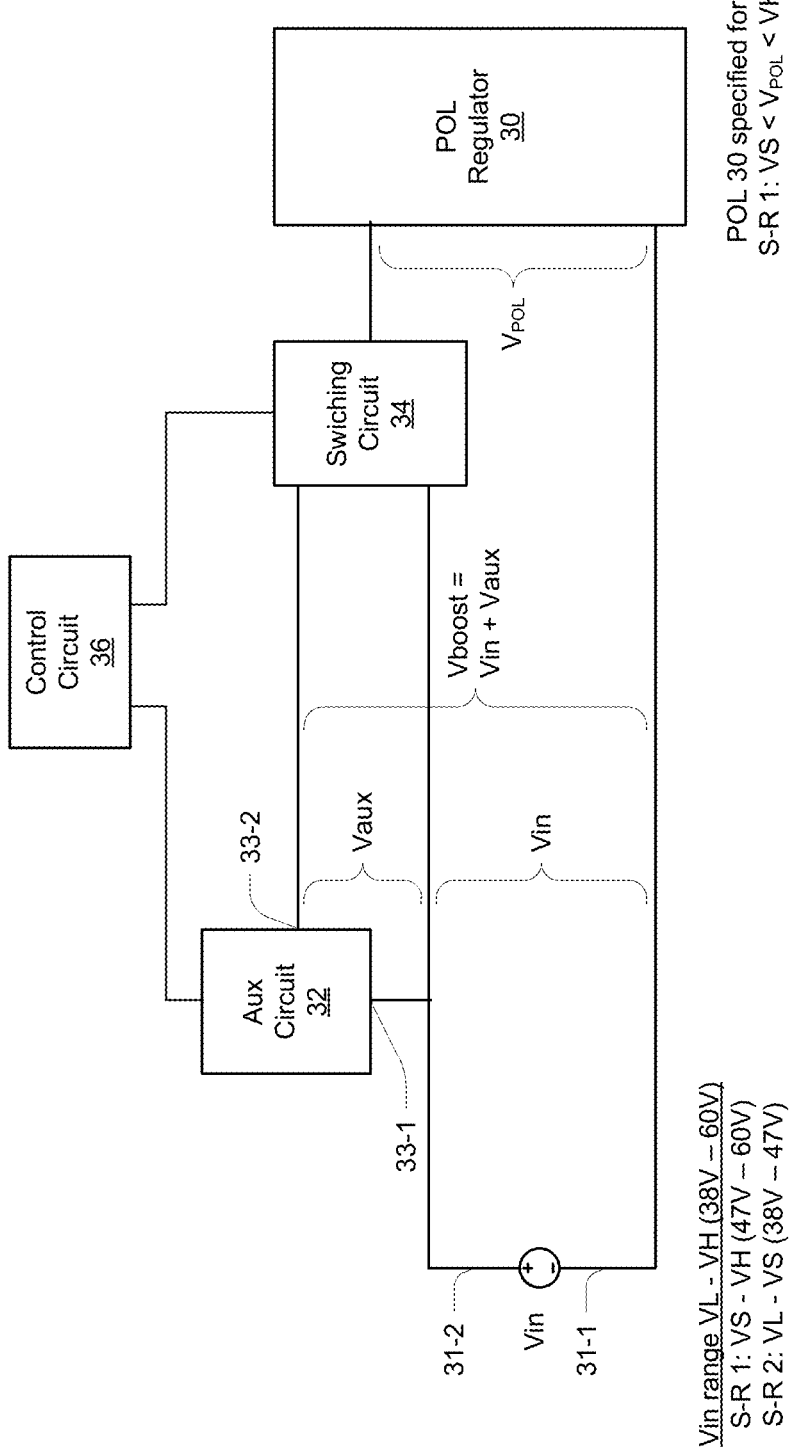
FIG. 4 is a block diagram of a power supply system incorporating an auxiliary circuit according to an embodiment of the invention.

FIG. 4 is a general block diagram of a power supply as disclosed herein. It includes one or more PoL regulators 30 generating a low output voltage (e.g., 1.2 V) relative to a much higher system input voltage Vin, which may be nominally 48 V for example, appearing across first and second input nodes 31-1, 31-2. The power supply includes an auxiliary (Aux) circuit 32 and switching circuitry 34 as well as control circuitry 36 as shown. The auxiliary circuit 32 provides an auxiliary voltage Vaux between first and second auxiliary circuit output nodes 33-1, 33-2. The first output node 33-1 is connected to the second input node 31-2 of Vin, so that the output of the auxiliary circuit 32 is connected in series with the input voltage Vin to thereby generate a boosted voltage Vboost which is the sum of Vin and Vaux. The switching circuitry 34 selects between Vin or Vboost as the supply voltage VPOL to the input of the PoL regulator 30 based on the magnitude of Vin. Control circuit 36 manages the transition between the two different operating states by enabling and disabling the auxiliary circuit 32 based on the magnitude of Vin and by operating the switching circuitry 34 for controlled application of the boosted voltage.

As shown, Vin covers a range VL to VH, while the PoL 30 is specified for input voltages in a sub-range VS to VH, where VS is greater than VL. VS may be viewed as a "switchover" voltage separating two sub-ranges of the input voltage: a first sub-range S-R 1 from VS to VH, and a second sub-range S-R 2 from VL to VS. In one embodiment, values for these voltages may be VL=38V, VH=60V, and VS=47 V. When the input voltage Vin is in the first sub-range S-R 1, the switching circuit 34 selects the input voltage Vin as the source of $V_{POL}$. When the input voltage is in the second sub-range S-R 2, the switching circuit 34 selects the boost voltage Vboost as the source of $V_{POL}$. Under these conditions, and assuming that Vaux is about equal to the difference between VS and VL, the voltage Vboost falls within the specified range VS-VH for the PoL regulator 30, which accordingly continues to operate with the high efficiency associated with this input voltage range.

In one aspect, the auxiliary circuit 32 may be an isolated converter whose output is connected in series with the input bus voltage. This is possible because of the isolated nature of an auxiliary converter, a key attribute of this solution.

Specific embodiments of the general scheme of FIG. 4 are given below. In these circuits, the designation of input nodes 31-1, 31-2 and auxiliary circuit output nodes 33-1, 33-2 are omitted for simplicity. Those skilled in the art will readily identify them based on the description.

Figure 5:
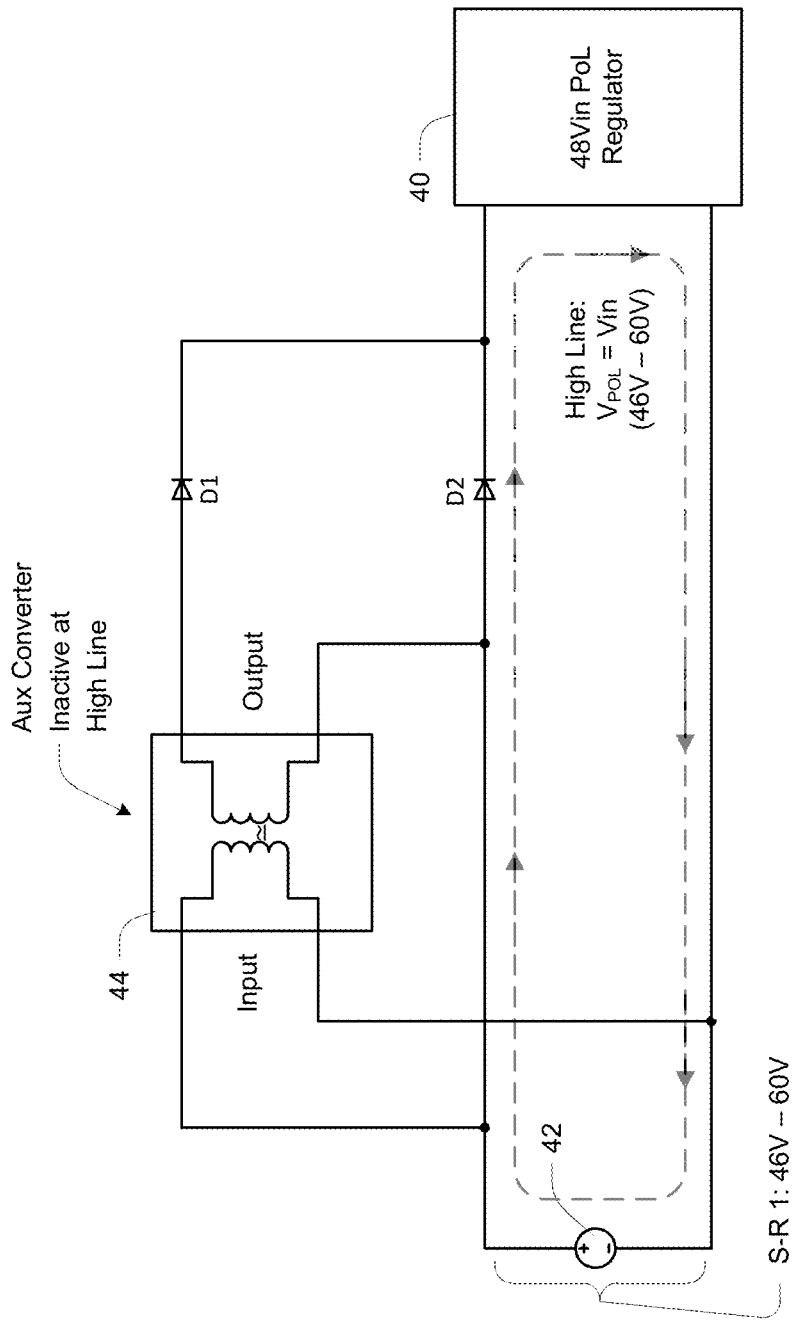
FIGS. 5 and 6 are schematic diagrams of a power supply incorporating an auxiliary circuit according to a first embodiment.
Figure 6:
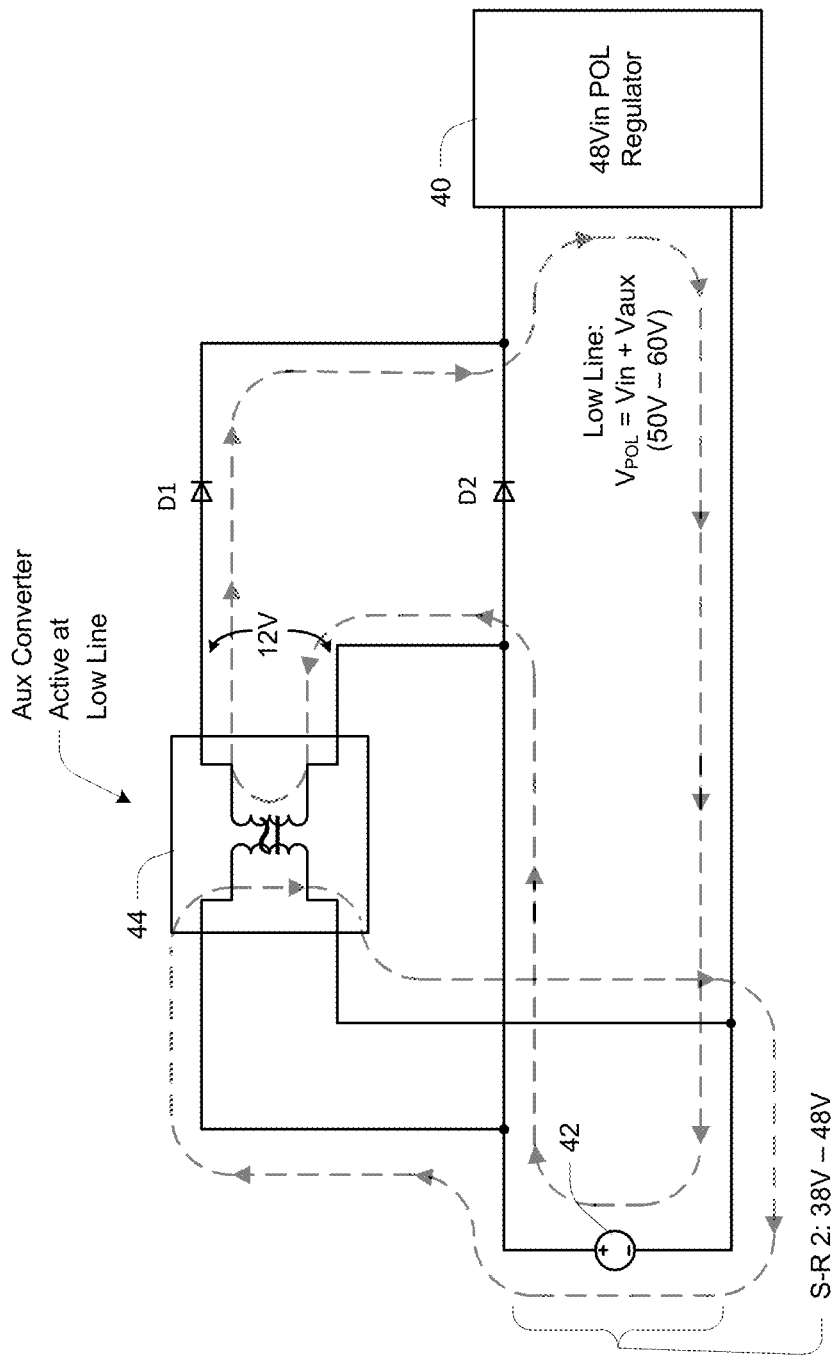

FIGS. 5 and 6 show a first example embodiment of a power supply according to the general scheme of FIG. 4. A PoL regulator 40 is used having an input voltage range of 46V-60V, whereas at the system level the input voltage from a 48-V supply 42 is in the range of 38V-60V. An auxiliary converter 44 is used to generate an auxiliary voltage of nominally 12V. The converter 44 is an isolated converter, as indicated by the transformer representation in FIGS. 5 and 6. It will be appreciated that this is a greatly simplified representation and that the auxiliary converter 44 is typically a more complicated circuit as will be apparent to those skilled in the art. Assuming that the auxiliary converter 44 employs a transformer, a transformer turns ratio of 4:1 may be used for example. The output from the auxiliary converter 44 is connected in series with the 48V source 42, and diodes D1, D2 provide the switching required for two distinct operating modes: normal/high line, and low line. Control circuitry corresponding to control circuit 36 of FIG. 4 is omitted for simplicity.

FIG. 5 illustrates the normal/high-line operating mode, in which the PoL regulator 40 receives its input power directly from the source 42, via diode D2. In this mode the auxiliary converter 44 may be disabled or disconnected, such as by operation of control circuitry, not shown.

FIG. 6 illustrates the circuit of FIG. 5 in the second, low-line operating mode, in which the auxiliary converter 44 is used to boost the input voltage to the PoL regulator 40 to a level compatible with its input voltage range. The system input voltage is in the range of 36V-48V as shown, while the resulting input voltage to the PoL regulator 40 remains within its specified range. This is due to the addition of the 12V output from the auxiliary converter 44 to the system input voltage, effected by the series connection. Switchover between the two operating modes of FIGS. 5 and 6 is facilitated by the fact that the auxiliary converter 44 is not processing power when the input voltage is within range but can store energy in its output capacitance. A power management function can be designed to trickle charge the output capacitance of the auxiliary converter 44 and to provide controlled switch of its output voltage based on the magnitude of the input voltage. The OR'ing diodes D1, D2 FIG. 5 and FIG. 6 can be replaced with active OR'ing diodes (switched MOSFETs) for maximum efficiency.

In the above, the 48V regulator 40 is a PoL regulator having a PoL output coupled to a load (not shown). It provides DC power to the load (1) at a first efficiency when a PoL input voltage applied to a PoL input of the PoL regulator is in a first sub-range of a specified input voltage range for the DC supply voltage (i.e., high line) and (2) at a second efficiency lower than the first efficiency when the PoL input voltage is in a second sub-range distinct from the first sub-range in the specified input voltage range (i.e., low line). Referring again to FIG. 3, the first sub-range might be greater than about 50 V, while the second sub-range is less than about 46 V. The supply has an auxiliary circuit having an output connected in series between the supply input and the PoL input, the auxiliary circuit being configured and operative to generate an auxiliary voltage and add it to the DC supply voltage to form the PoL input voltage as a sum thereof when the DC supply voltage is in the second sub-range. In the simplified example of FIGS. 5 and 6 this is the auxiliary converter 44. It also has switching circuitry that operates in response to a level of the DC supply voltage to (1) connect the supply input to the PoL input to apply the DC supply voltage as the PoL input voltage when the DC supply voltage is in the first sub-range, and (2) connect the output of the auxiliary circuit to the PoL input to apply the boosted supply voltage as the PoL input voltage when the DC supply voltage is in the second sub-range. In the simplified circuit of FIGS. 5 and 6, the switching circuitry includes the OR'ing diodes D1 and D2.

Figure 7:
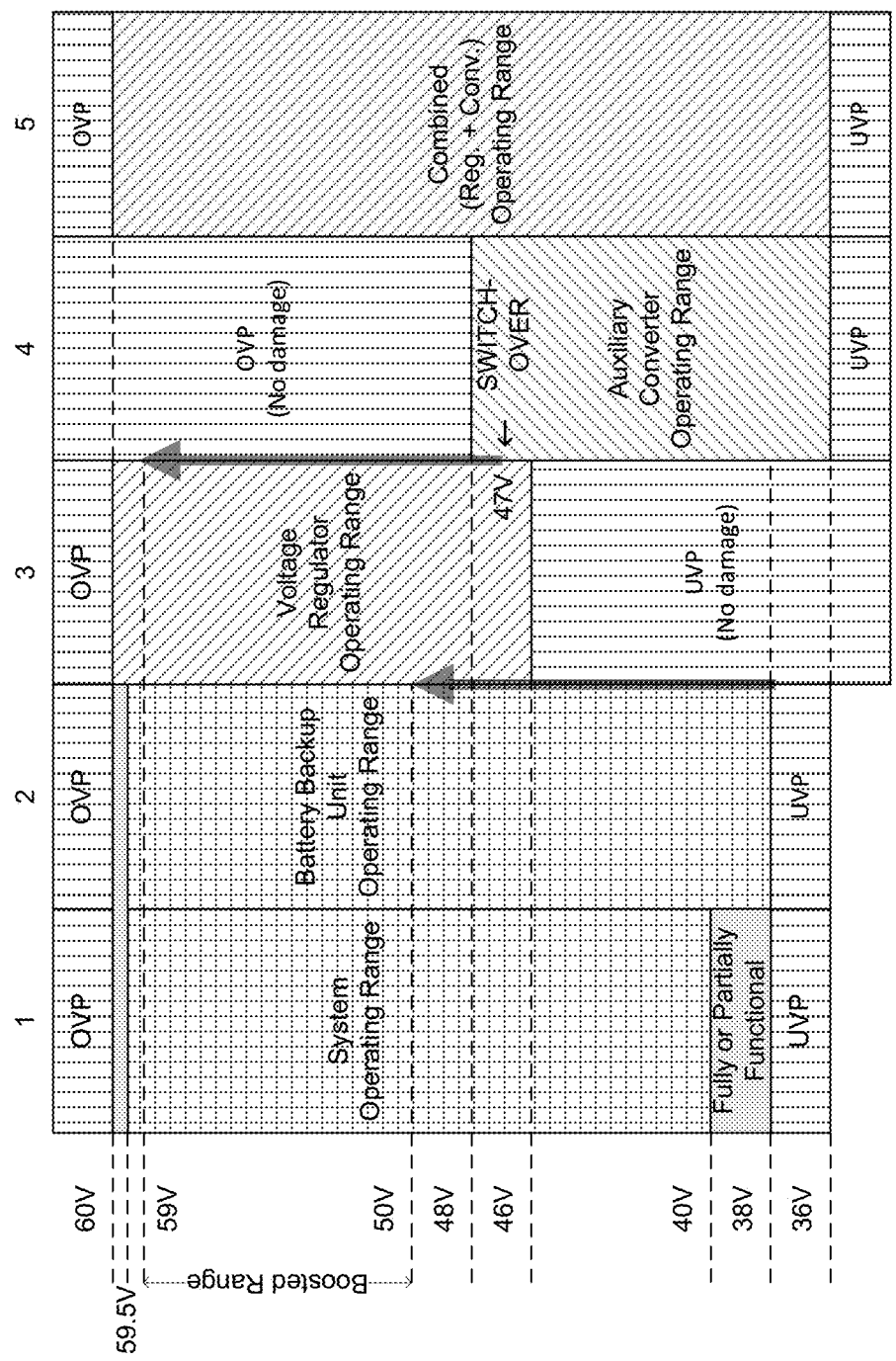
FIG. 7 is a plot of operating ranges in the power supply of FIGS. 5 and 6.

FIG. 7 is a chart illustrating the different input voltage ranges of an example OCP motherboard design using the solution of FIGS. 5-6. In FIG. 7, the five columns labelled 1-5 are defined as follows:

1. The System Operating Range (40V-59.5V) is the voltage range where the system provides full performance. Reduced performance are considered acceptable from 38V to 40V and from 59.5V to 60V. Below 38V, under-voltage protection (UVP) is active, and over-voltage protection (OVP) is active above 60V. The OVP and UVP ranges of the voltage regulators and auxiliary converter are generally different from the OVP and UVP ranges of the complete system.
2. The Battery Backup Unit Operating Range (38V-59.5V) is the voltage fed to a local 48V DC UPS battery, which provides secondary power in the event of a primary source outage. It may be desirable to provide full performance over this range.
3. The Voltage Regulator Operating Range (46V-60V) is the preferred input voltage range of PoL regulators (e.g., 44) used on the board.
4. The Auxiliary Converter Operating Range (36V-48V) is the preferred input voltage range of an isolated auxiliary converter used on the board.
5. The Combined (Reg.+Conv.) Operating Range is the total input voltage range covered by this method.

In the example of FIG. 7 the auxiliary converter output voltage is nominally 12V, indicated by the dark arrows. The SWITCHOVER voltage (47V in this example) is the voltage below which the auxiliary converter becomes operative. With the voltage value shown, the Boosted Range falls within the regulator input voltage range and the Combined Operating Range exceeds the System Operating Range.

The present solution is not limited to the operating ranges illustrated in FIG. 7. It may be applicable with different operating ranges as long as the criteria for the selection of the appropriate input voltage range of each converter are met. It is worth noting that the auxiliary converter is generally able to sustain the full operating voltage range even though it needs to be operative only when the input voltage is low.

Figure 8:
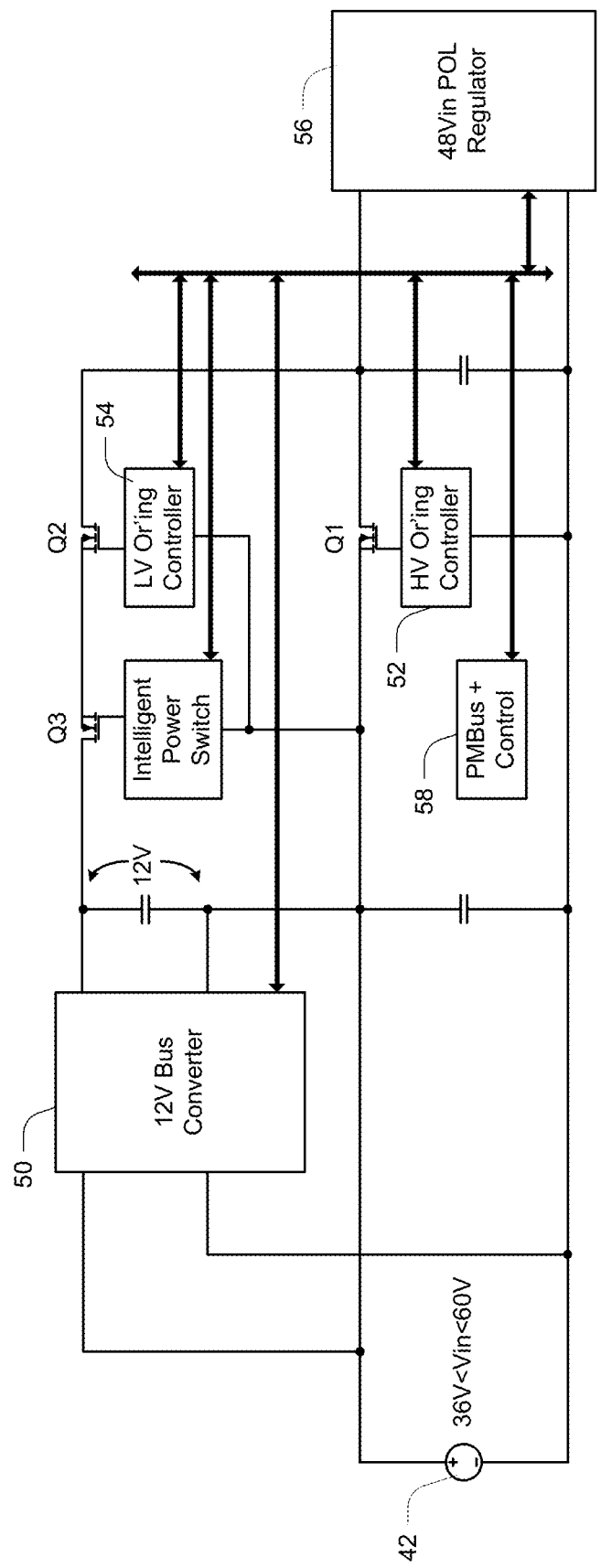
FIG. 8 is a more detailed schematic of a power supply according to FIGS. 5 and 6.

FIG. 8 shows a more specific implementation of the circuit of FIGS. 5-6. In the illustrated configuration, the auxiliary converter is implemented using a standard Intermediate Bus Converter (IBC) 50 with input voltage range and output voltage meeting the criteria illustrated in FIG. 7 above. The active OR'ing diode Q1 in series with the input bus voltage is implemented with a high side MOSFET controlled by a high voltage (HV) active diode controller 52. The active OR'ing diode Q2 in series with the auxiliary converter output is implemented with a high side MOSFET controlled by a low voltage (LV) active diode controller 54. An additional MOSFET Q3 is connected in series with the low voltage active OR'ing diode Q2 and is configured to be operated as a controlled switch. The Q3 MOSFET function is to effectively isolate the output of the auxiliary converter 50 from the rest of the system under specific operating conditions. This function is valuable for two reasons: 1) it enables a controlled switchover of the voltage fed to the 48V-to-PoL regulator(s) 56 from the input bus voltage to the boosted voltage through inrush current limiting and capacitance charge balancing; 2) it allows the auxiliary converter 50 to charge its own output capacitance and be disabled or disconnected until the voltage across the capacitance falls below a predetermined value. A hysteretic control can be conveniently used for the capacitance charging function for maximum system efficiency. The output capacitance provides instantaneous energy when the input voltage falls below the switchover threshold filling the gap that may exist until the auxiliary converter completes its startup sequence.

For applications following the OCP voltage requirements, the output voltage of IBC 50 can either be non-regulated, semi-regulated or fully regulated. The latter case naturally lends itself to an additional power management feature as described further below. In general, any isolated topology is suitable for the auxiliary converter function. Standard IBC output voltages of 12V, 10.5V (regulated or semi-regulated) and even 9.6V (regulated or unregulated with 5:1 ratio typical of fixed duty cycle IBCs), are all compatible with OCP voltage ranges and are commonly available in commercial products (bricks). Since the voltage and current information are already present in the active OR'ing building blocks, a telemetry function can be implemented in the "PMBus+Control" building block 58. The control bus can be any industry standard digital bus and protocol commonly used for this type of function and can be used to further optimize system operation. For instance, the output voltage of a regulated IBC could be trimmed using the digital control bus to maintain the input voltage to the voltage regulators at the optimum value for highest efficiency.

In a typical analog system, the 12V Bus Converter 50 is enabled/disabled by its own under- and over-voltage lockout circuit. When the output voltage of the bus converter is present, the intelligent power switch automatically ramps it up while connecting it in series with the input voltage. MOSFETs Q1 and Q2 are automatically operated as diodes by means of LV and HV OR'ing controllers. Alternatively, if a digital host controller IC is available, the same sequence can be controlled through the PMBus as block 58 typically contains input voltage telemetry. A mix of the two system is also possible.

Figure 9:
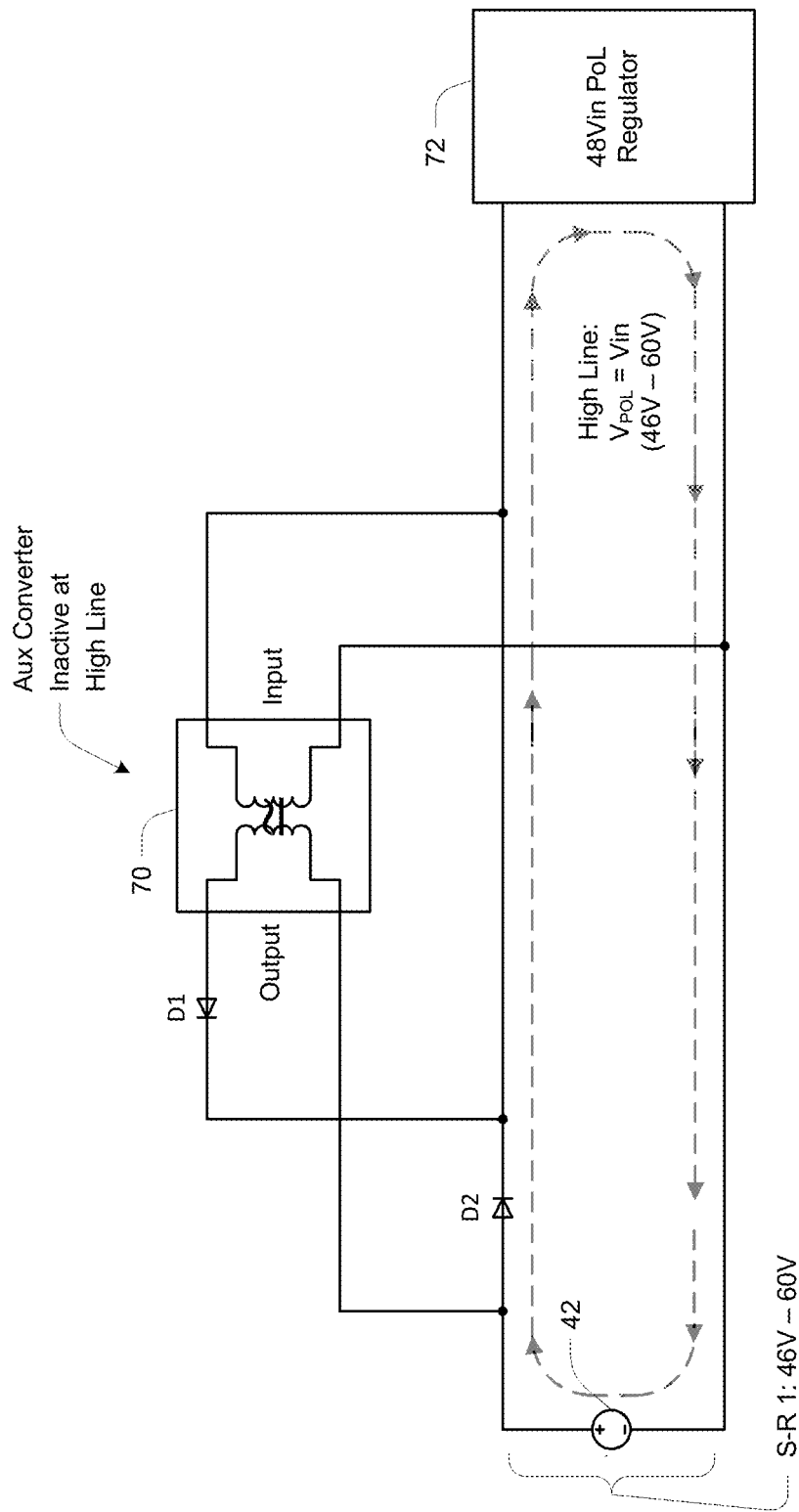
FIGS. 9 and 10 are schematic diagrams of a power supply incorporating an auxiliary circuit according to a second embodiment.

FIG. 9 shows a second example arrangement, in which the input to the auxiliary converter 70 is on the cathode side of diode D2, rather than on the anode side as in FIGS. 5-6. In some cases, an active OR'ing diode in series with the input bus voltage is a standard requirement and already present on typical motherboard designs. In arrangements like those of FIGS. 5-6 and 8 having the auxiliary converter input on the anode side, and additional active OR'ing diode connected before the input of the auxiliary converter may be necessary. In FIG. 9, the input of the auxiliary converter 70 is on the cathode side of the diode D2, and thus this configuration may not add an extra component in the power processing path. Only one active OR'ing diode is passing the input current to the PoL regulator 72 in both operating states, i.e. normal operation and low line operation, and the impact on overall efficiency can be considered negligible. Control circuitry corresponding to control circuit 36 of FIG. 4 is omitted for simplicity.

FIG. 9 also illustrates the normal/high-line operating mode, in which the PoL regulator 72 receives its input power directly from the source 42, via diode D2. In this mode the auxiliary converter 70 may be disabled or disconnected.

Figure 10:
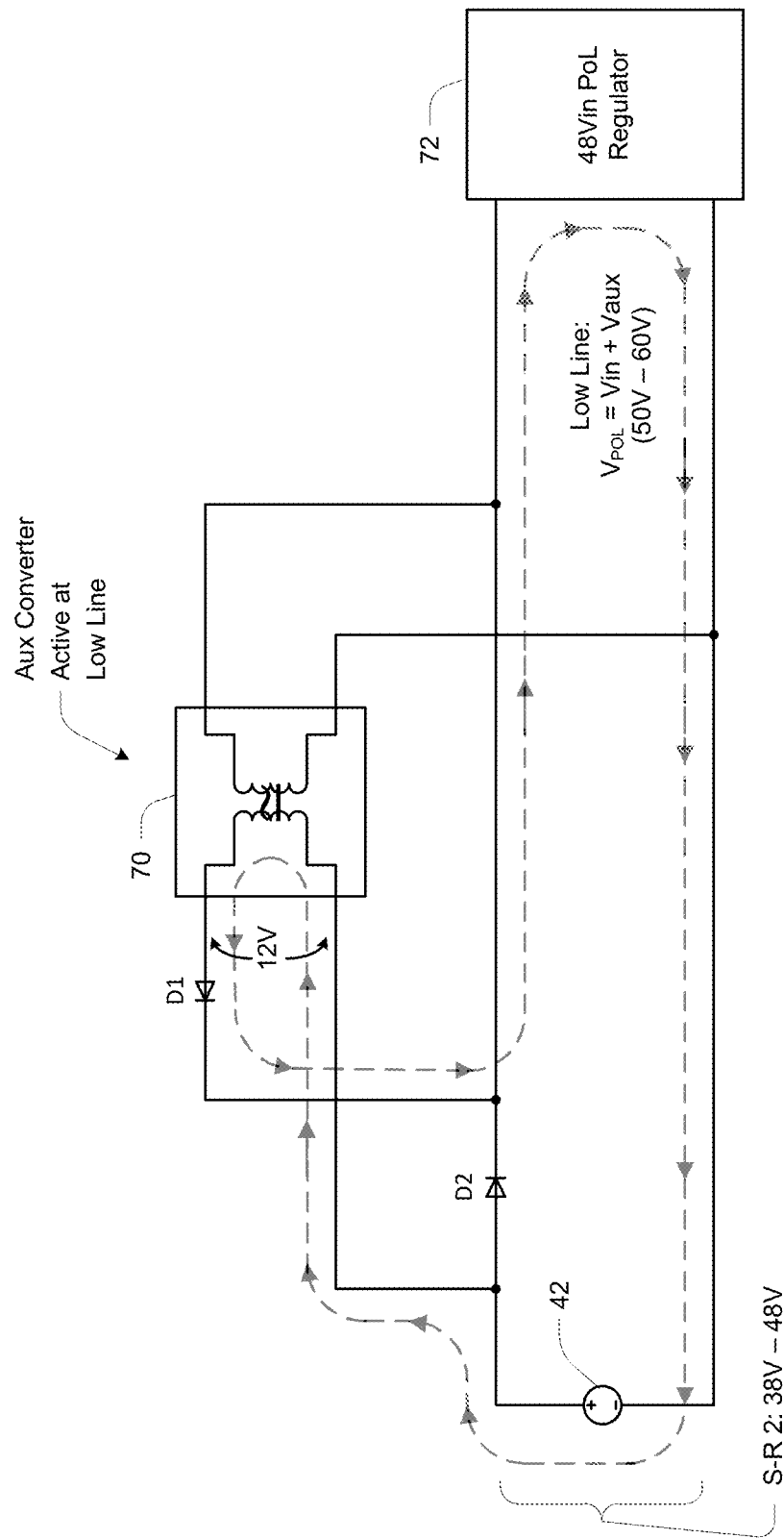

FIG. 10 illustrates the circuit of FIG. 9 in the second, low-line operating mode, in which the auxiliary converter 70 is used to boost the input voltage to the PoL regulator 72 to a level compatible with its input voltage range.

Figure 11:
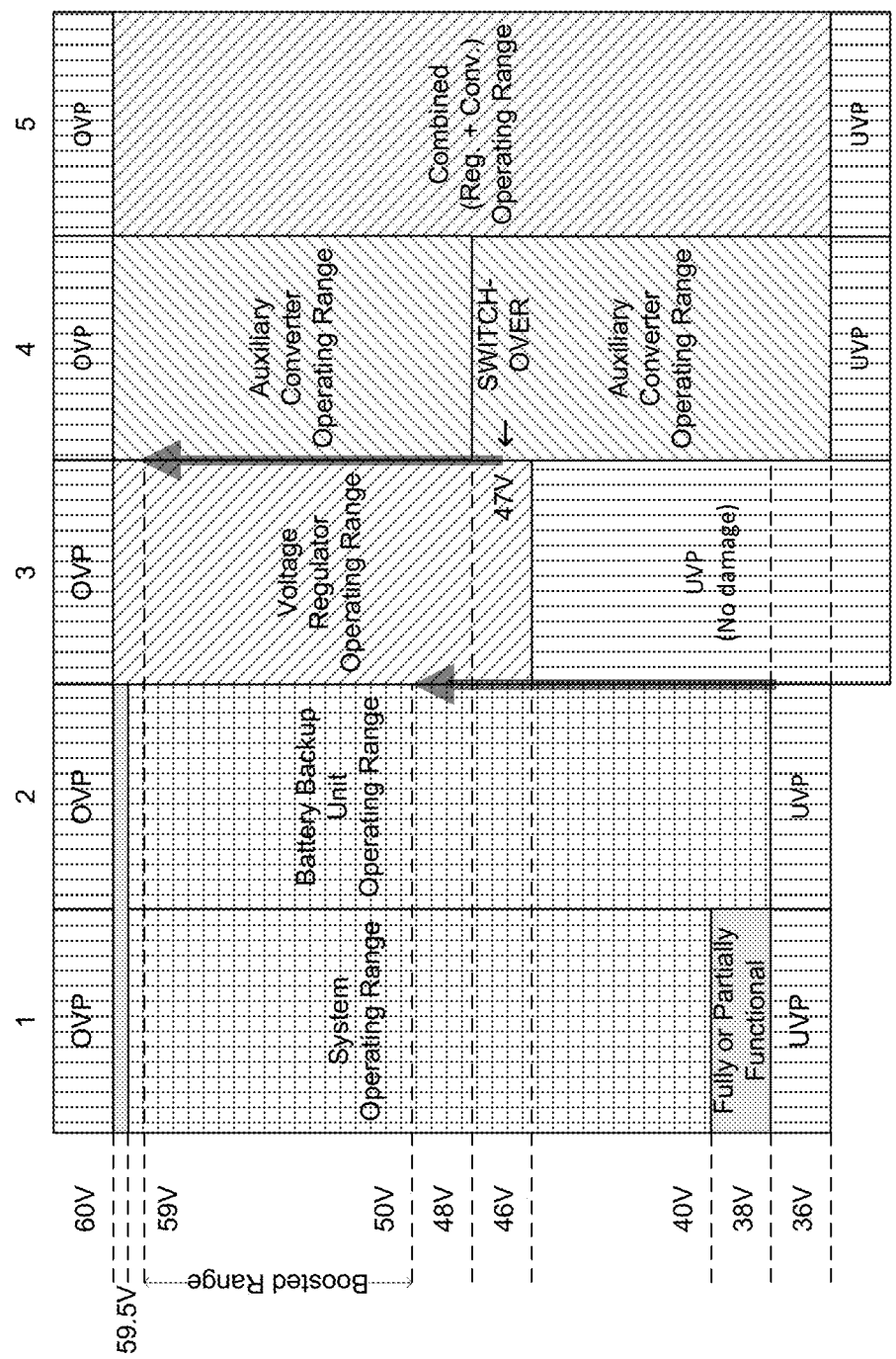
FIG. 11 is a plot of operating ranges in the power supply of FIGS. 9 and 10.

FIG. 11 illustrates the input voltage ranges for the circuit of FIGS. 9-10, similarly to FIG. 7 described above. The voltage in the shaded area of column 4 in FIG. 11 can be either the source voltage alone or the sum of the source voltage plus the output voltage of the auxiliary converter. It is apparent that the auxiliary converter does not provide additional voltage when the input voltage is above the switchover voltage but, at the same time, is functional above the switchover voltage when the source voltage is low. A power management function is preferably included to disconnect the auxiliary converter when the source voltage, on the anode of Q1, is above the switchover voltage of FIG. 11. This is possible because the source voltage information is independent of the input voltage to the auxiliary converter and is available on the "anode" side of MOSFET Q1. Then MOSFET Q3 can disconnect the output voltage of the auxiliary converter when appropriate. MOSFET Q3 turn off is accomplished either with an analog signal coming from the HV OR'ing controller or with a PMBus command.

Figure 12:
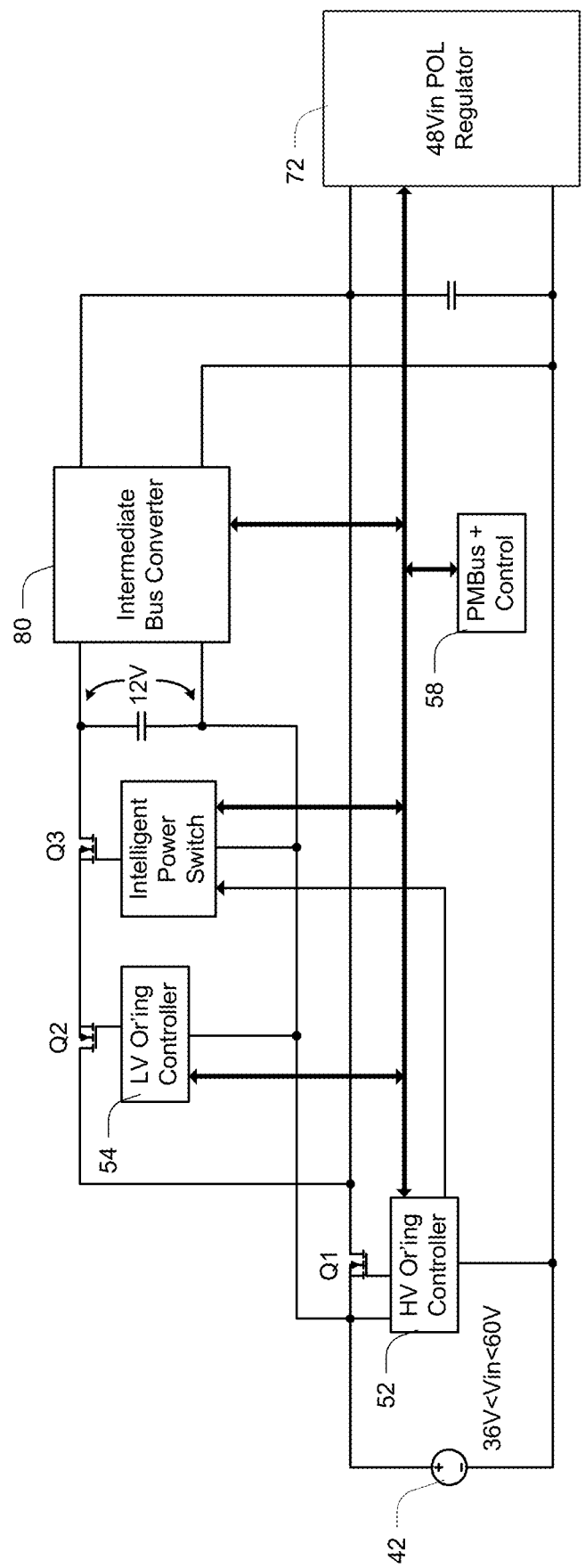
FIG. 12 is a more detailed schematic of a power supply according to FIGS. 9 and 10.

FIG. 12 illustrates an implementation of the configuration of FIGS. 9-10 using MOSFETs to replace diodes. Similar to the circuit of FIG. 8, it has active diodes Q1, Q2 and Q3 as well as corresponding controllers 52, 54 and a PMBus+ controller 58. The input voltage range of the auxiliary converter 80 of FIG. 12 is necessarily wider than its equivalent 50 of FIG. 8 because the converter 80 is functional across the complete input voltage range of the system.

A comparison between the industry standard boost converter solution and a series-connected bus converter solution can be done assuming a realistic conversion efficiency of 97% for both converters, 94.7% efficiency for the voltage regulator and a 600 W total output power. The boost converter is processing 635 W and dissipating nearly 20 W without meeting the OCP minimum efficiency requirement. The series-connected bus converter is only processing 155 W and is achieving the 94% minimum efficiency target with a power dissipation of less than 5 W. The boost converter would have to be 99.3% efficient to achieve the same overall efficiency results.

While various embodiments of the invention have been particularly shown and described, it will be understood by those skilled in the art that various changes in form and details may be made therein without departing from the scope of the invention as defined by the appended claims.

What is claimed is:

1. A DC power supply for providing DC power to a load at a DC load voltage substantially lower than a nominal DC supply voltage at a supply input, the supply input including a first node and a second node, the DC supply voltage being produced between the second node and the first node, comprising:

a point-of-load (PoL) regulator having a PoL output coupled to the load, the PoL regulator being configured and operative to provide DC power to the load (1) at a first efficiency when a PoL input voltage applied to a PoL input of the PoL regulator is in a first sub-range of a specified input voltage range for the DC supply voltage, and (2) at a second efficiency lower than the first efficiency when the PoL input voltage is in a second sub-range distinct from the first sub-range in the specified input voltage range;

an auxiliary circuit having an output including a first output node and second output node, the auxiliary circuit being configured and operative to generate an auxiliary voltage between the second output node and the first output node, the first output node being connected to the second node of the supply input to thereby add the auxiliary voltage to the DC supply voltage to form a boosted supply voltage between the second output node of the auxiliary circuit and the first node of the supply input; and switching circuitry configured and operative in response to a level of the DC supply voltage to (1) connect the second node of the supply input to the PoL input to apply the DC supply voltage as the PoL input voltage when the DC supply voltage is in the first sub-range, and (2) connect the second output node of the auxiliary circuit to the PoL input to apply the boosted supply voltage as the PoL input voltage when the DC supply voltage is in the second sub-range, wherein the switching circuitry includes first and second parallel-connected diodes, the first diode connected in series between the supply input and the PoL input, the second diode connected in series between the output of the auxiliary circuit and the PoL input.

2. The DC power supply of claim 1, wherein the auxiliary circuit is an isolated converter maintaining DC isolation between the output of the auxiliary circuit and an input of the auxiliary circuit.

3. The DC power supply of claim 1, wherein an input of the auxiliary circuit is connected at an anode side of the first diode.

4. The DC power supply of claim 1, wherein an input of the auxiliary circuit is connected at a cathode side of the first diode.

5. A DC power supply for providing DC power to a load at a DC load voltage substantially lower than a nominal DC supply voltage at a supply input, the supply input including a first node and a second node, the DC supply voltage being produced between the second node and the first node, comprising:

a point-of-load (PoL) regulator having a PoL output coupled to the load, the PoL regulator being configured and operative to provide DC power to the load (1) at a first efficiency when a PoL input voltage applied to a PoL input of the PoL regulator is in a first sub-range of a specified input voltage range for the DC supply voltage, and (2) at a second efficiency lower than the first efficiency when the PoL input voltage is in a second sub-range distinct from the first sub-range in the specified input voltage range;

an auxiliary circuit having an output including a first output node and second output node, the auxiliary circuit being configured and operative to generate an auxiliary voltage between the second output node and the first output node, the first output node being connected to the second node of the supply input to thereby add the auxiliary voltage to the DC supply voltage to form a boosted supply voltage between the second output node of the auxiliary circuit and the first node of the supply input; and switching circuitry configured and operative in response to a level of the DC supply voltage to (1) connect the second node of the supply input to the PoL input to apply the DC supply voltage as the PoL input voltage when the DC supply voltage is in the first sub-range, and (2) connect the second output node of the auxiliary circuit to the PoL input to apply the boosted supply voltage as the PoL input voltage when the DC supply voltage is in the second sub-range, wherein:

the auxiliary circuit is implemented using an intermediate bus converter;

the switching circuitry includes (a) a first high side MOSFET in series with the supply input and controlled by a high voltage active diode controller, and (b) a second high-side MOSFET in series with the output of the auxiliary circuit and controlled by a low voltage active diode controller.

6. The DC power supply of claim 5, further including an additional MOSFET connected in series with the second high-side MOSFET, the additional MOSFET configured to be operated as a controlled switch to selectively isolate the output of the auxiliary circuit from the rest of the system, thereby providing for (1) a controlled switchover of voltage fed to the PoL regulator from the DC supply voltage to the boosted supply voltage through inrush current limiting and capacitance charge balancing, and 2) the auxiliary circuit charging its own output capacitance and being disabled or disconnected until a voltage across the output capacitance falls below a predetermined value.

7. The DC power supply of claim 5, wherein the auxiliary circuit is an isolated converter maintaining DC isolation between the output of the auxiliary circuit and an input of the auxiliary circuit.

* * * * *